United States Patent
Rao et al.

(10) Patent No.: US 7,260,461 B2
(45) Date of Patent: Aug. 21, 2007

(54) METHOD FOR OPERATING A PRE-CRASH SENSING SYSTEM WITH PROTRUDING CONTACT SENSOR

(75) Inventors: Manoharprasad K. Rao, Novi, MI (US); Mark Cuddihy, New Boston, MI (US); David Bauch, South Lyon, MI (US); Joseph Brown, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 18 days.

(21) Appl. No.: 11/163,796

(22) Filed: Oct. 31, 2005

(65) Prior Publication Data

US 2007/0100527 A1 May 3, 2007

(51) Int. Cl.
*B60R 22/00* (2006.01)
*G05D 3/00* (2006.01)
*G06F 7/00* (2006.01)
*G06F 17/00* (2006.01)

(52) U.S. Cl. .................. 701/45; 180/271; 180/274; 280/728.1; 280/734; 280/777; 340/436

(58) Field of Classification Search .................. 701/45; 180/274, 271, 735; 280/734, 735, 728.1, 280/777; 361/1
See application file for complete search history.

(56) References Cited

U.S. PATENT DOCUMENTS

| | | | | |
|---|---|---|---|---|
| 3,842,930 A | * | 10/1974 | Fiala | 280/735 |
| 4,706,990 A | * | 11/1987 | Stevens | 280/734 |
| 5,101,927 A | | 4/1992 | Murtuza | |
| 5,141,193 A | * | 8/1992 | Behr | 248/309.1 |
| 5,145,208 A | * | 9/1992 | Hoagland et al. | 280/734 |
| 5,416,293 A | * | 5/1995 | Reneau | 200/61.45 M |
| 6,959,944 B2 | * | 11/2005 | Mori et al. | 280/728.2 |
| 2003/0195685 A1 | * | 10/2003 | Mori et al. | 701/45 |
| 2004/0036261 A1 | * | 2/2004 | Breed | 280/735 |
| 2004/0111200 A1 | * | 6/2004 | Rao et al. | 701/45 |
| 2004/0117086 A1 | * | 6/2004 | Rao et al. | 701/36 |
| 2004/0117091 A1 | * | 6/2004 | Prakah-Asante et al. | 701/45 |
| 2005/0046584 A1 | * | 3/2005 | Breed | 340/825.72 |
| 2005/0206142 A1 | * | 9/2005 | Prakah-Asante et al. | 280/735 |
| 2005/0248131 A1 | * | 11/2005 | Mori et al. | 280/728.1 |

\* cited by examiner

*Primary Examiner*—Thomas Black
*Assistant Examiner*—Jorge O Peche
(74) *Attorney, Agent, or Firm*—Franklin A. MacKenzie; Dickinson Wright PLLC (57) ABSTRACT

A method of operating a restraint system includes classifying a collision into a collision classification, generating a protruding contact sensor output and deploying the restraint system in response to the contact sensor output and the output classification. The method may also use a pre-crash sensor with or without classification and deploy the restraint system in response to the pre-crash sensor signal and the protruding contact sensor signal.

7 Claims, 5 Drawing Sheets

METHOD FOR OPERATING A PRE-CRASH SENSING SYSTEM WITH PROTRUDING CONTACT SENSOR

TECHNICAL FIELD

The present invention relates to pre-crash sensing systems for automotive vehicles, and more particularly, to pre-crash sensing systems having a protruding contact sensor used for pre-crash detection.

BACKGROUND

Auto manufacturers are investigating radar, lidar, and vision-based pre-crash sensing systems to improve occupant safety. Pre-crash sensing systems have been recognized to have the potential of improving occupant safety by deploying the passive restraints devices earlier in a crash, or even before the actual impact. This extra time allows more flexibility for component design and can allow the passive restraints system to be individually tailored to the occupant and crash scenario.

Current vehicles typically employ accelerometers that measure decelerations acting on the vehicle body in the event of a crash. In response to accelerometers, airbags or other safety devices are deployed. The pre-crash sensors also sense information before impact concerning the size and closing velocity of the object, which cannot be calculated by conventional accelerometer-based sensors until after the crash. In certain crash situations it would be desirable to provide information before forces actually act upon the vehicle when a collision is unavoidable. The pre-crash sensing systems that exist today are significantly more complex than the accelerometer based systems, both in hardware and algorithm complexity.

Remote sensing systems using radar, lidar or vision based technologies for adaptive cruise control, collision avoidance and collision warning applications are known. These systems have characteristic requirements for avoiding false alarms. Generally, the remote sensing system reliability requirements for pre-crash sensing for automotive safety related systems are more stringent than those for comfort and convenience features, such as, adaptive cruise control. The reliability requirements even for safety related features vary significantly, depending upon the safety countermeasure under consideration. For example, tolerance towards undesirable activations may be higher for activating motorized seatbelt pretensioners than for functions such as vehicle suspension height adjustments. Non-reversible safety countermeasures, including airbags, require extremely reliable sensing systems for pre-crash activation.

Traditional pre-crash sensors such as radar, vision and laser systems are not capable of sensing the mass or stiffness of an object, which help define the collision severity of the crash event. Redundant sensors are necessary in order to achieve long-range target tracking, while also providing accurate short-range information about an impact-imminent target. Furthermore, the algorithms that have been developed to detect objects and imminent collisions are required to meet very high reliability targets for deploying non-reversible passive restraints devices (e.g. airbags). Given the complexity of the pre-crash sensing signal, along with the required fusion of targets from multiple sensors, often employing different technologies for sensing, such high reliability has not yet been achieved. Thus, to date, all applications of pre-crash sensing to restraints have been limited to either pre-arming of non-reversible restraints (e.g. airbags), or deploying of reversible restraint devices (e.g. electromechanical seatbelt pretensioners).

It would therefore be desirable to provide a pre-crash sensing system that provides accurate determinations as to the presence of a potential collision target. It would also be desirable to provide a system that takes into consideration the stiffness of the object detected.

SUMMARY OF THE INVENTION

The present invention provides an improved pre-crash sensing system that reduces false activations and activates a countermeasure in response to the stiffness of the object detected.

The present invention uses the addition of a mechanical pre-crash sensor to supplement the conventional pre-crash sensor suite. The mechanical pre-crash sensor contains an extendable arm, which is normally flush with the vehicle, but extends out from the vehicle a predetermined distance (eg. 6") based on either the vehicle speed, or on a signal from the conventional pre-crash sensors that a target has been identified. Once extended, the mechanical pre-crash sensor makes contact with an object immediately prior to a crash. In this way, the sensor can provide a high reliability verification of contact with another object prior to the object impacting the vehicle. By comparing the known force which is extending the arm with the speed at which the extendable arm is pushed back into the vehicle, the sensor can also identify the stiffness of the object contacting it. These two features address the two main weaknesses of the conventional pre-crash sensors, namely, the reliability of contact prediction and the identification of the stiffness of the collision object, making the mechanical pre-crash sensor an ideal complimentary technology. The mechanical pre-crash sensor can be added to any conventional pre-crash sensing suite, whether it be radar-based, vision, ultrasonic, or laser-based, making the pre-impact deployment of non-reversible restraints feasible without a high risk of inadvertent deployments. The algorithm required to interpret the data from the mechanical pre-crash sensor is also relatively simple, reducing the processing power required and improving the software reliability of the pre-crash sensors, compared to complex, computationally demanding target identification and tracking software.

Other advantages and features of the present invention will become apparent when viewed in light of the detailed description of the preferred embodiment when taken in conjunction with the attached drawings and appended claims.

DESCRIPTION OF THE PREFERRED EMBODIMENT

In the following figures the same reference numerals will be used to identify the same components. While the present invention is illustrated with respect to several types of pre-crash sensors, various types and combinations of pre-crash sensors may be used as will be further described below.

Figure 1:
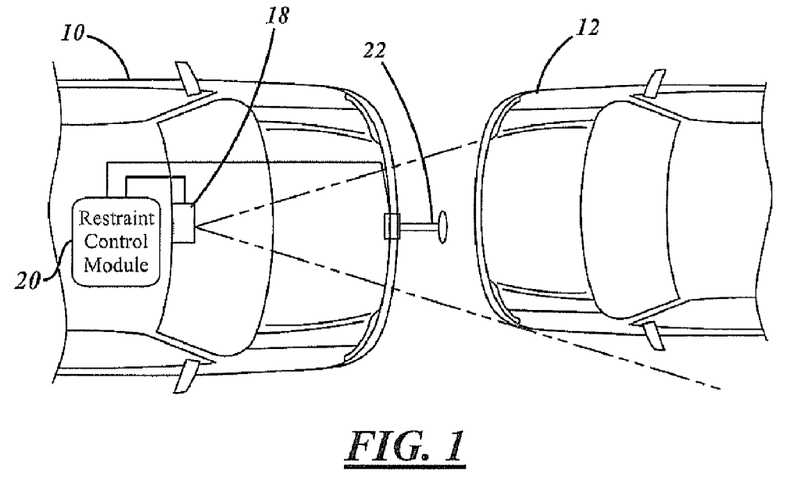
FIG. 1 is a top view of a host vehicle relative to a crash object according to the present invention.

Referring now to FIG. 1, a host vehicle 10 is illustrated with respect to a crash object such as an another vehicle 12. The host vehicle 10 includes an object or pre-crash sensor 18 that is coupled to an airbag or other restraint control module (RCM) 20. In addition, a mechanical contact sensor 22 is shown protruding from the front of the vehicle. In response to the pre-crash sensor 18 and the mechanical pre-crash sensor 22, the RCM 20 activates an airbag within the vehicle as will be further described below.

Figure 2:
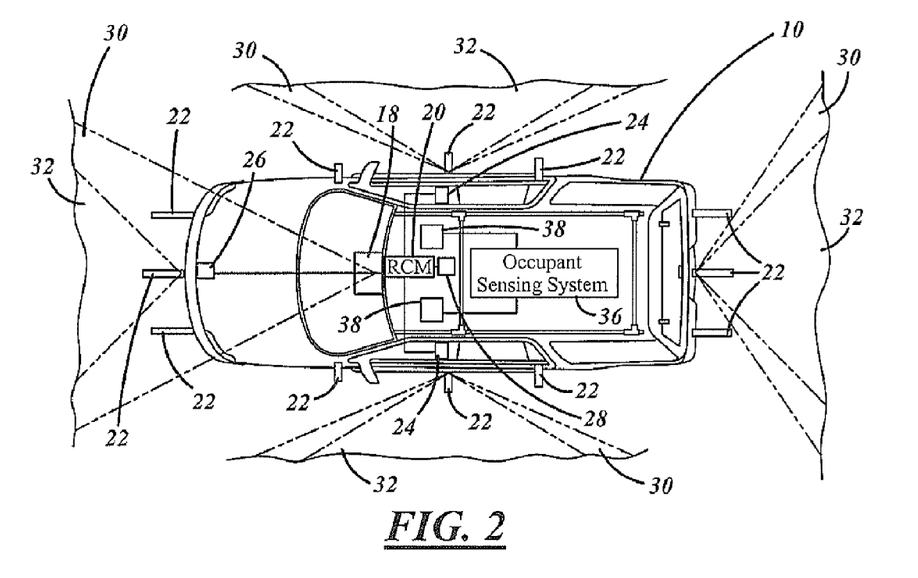
FIG. 2 is a top view of a host vehicle illustrating the various exterior views and a simple block diagrammatic view of the occupant sensing system and a restraint control module.

Referring now to FIG. 2, the host vehicle 10 is illustrated in further detail. The host vehicle 10 is shown having the restraint or airbag control module, RCM, 20 therein. The restraint control module 20 may be coupled to lateral accelerometers 24 disposed on both sides of the vehicle. Also, a longitudinal accelerometer 26 may be provided near the front of the vehicle 10. An accelerometer housing 28 having a longitudinal accelerometer positioned near the center of gravity of the vehicle may also be provided. A lateral accelerometer may also be positioned at the physical center of the vehicle floor within housing 28.

FIG. 2 illustrates various mechanical contact sensors 22 positioned at various locations around the vehicle. One suitable embodiment for a mechanical pre-crash sensor will be further described below.

The pre-crash sensor 18 is illustrated having a range of view for a vision system 30 and a range of view for a lidar/radar system 32. Front, rear, and right and left side ranges of views for the vision and lidar/radar systems are illustrated.

Vehicle 10 may also include an occupant sensing system 36 that includes occupant sensors 38. The occupant sensors 38 may include various types of sensors including sensors that determine the weight, volume, and/or position of the occupants within the vehicle.

Figure 3:
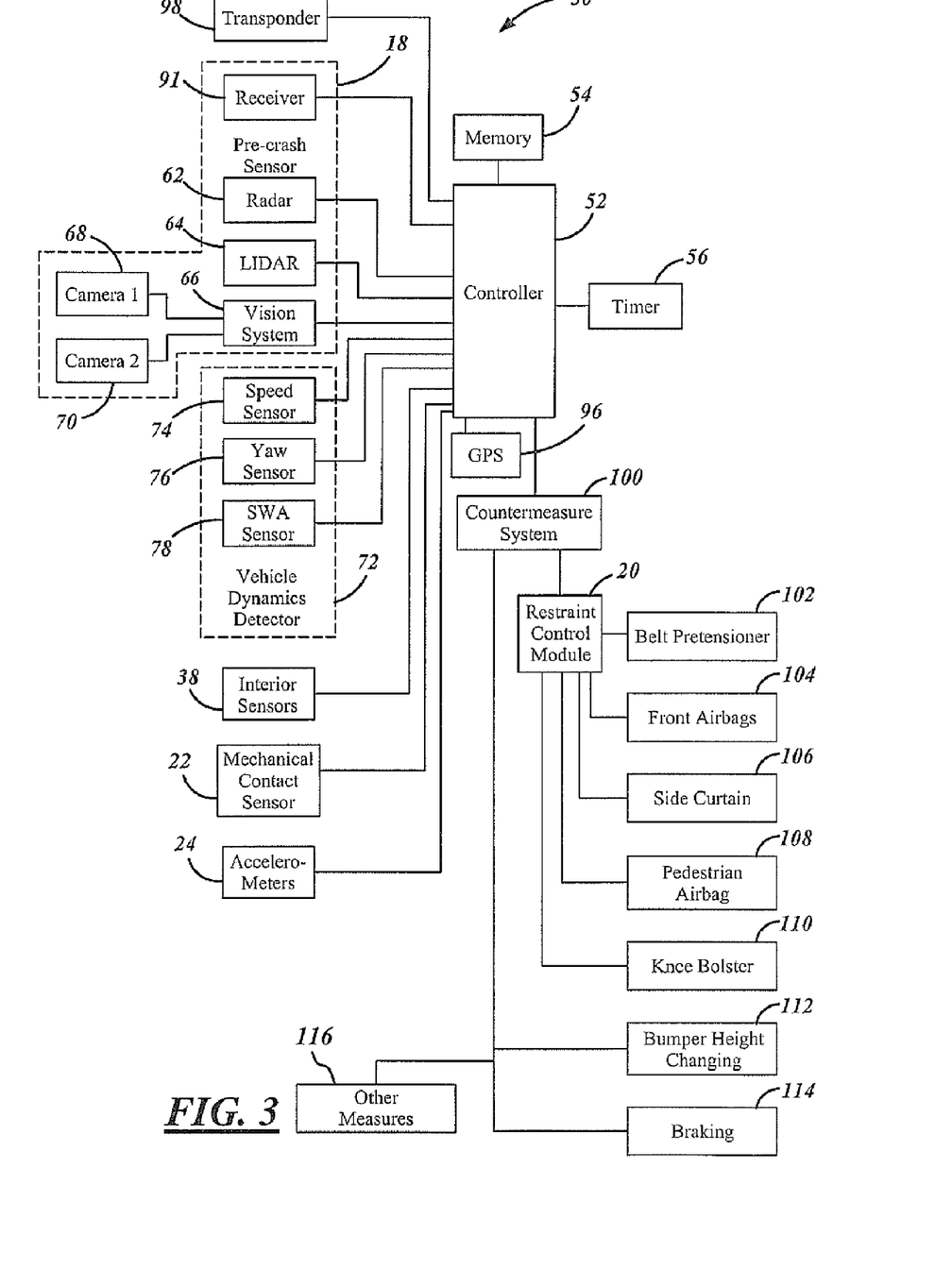
FIG. 3 is a block diagrammatic view of the system according to the present invention.

Referring to FIG. 3, a pre-crash safety system 50 has a controller 52. Controller 52 is preferably a microprocessor-based controller that is coupled to a memory 54 and a timer 56. Memory 54 and timer 56 are illustrated as separate components from that of controller 52. However, those skilled in the art will recognize that memory 54 and timer 56 may be incorporated into controller 52.

Memory 54 may comprise various types of memory including read only memory, random access memory, electrically erasable programmable read only memory, and keep alive memory. Memory 54 is used to store various thresholds and parameters as will be further described below.

Timer 56 is a timer such as a clock timer of a central processing unit within controller 52. Timer 56 is capable of timing the duration of various events as well as counting up or counting down. For example based on time, the acceleration of the vehicle can be determined from a velocity.

A remote object or pre-crash sensor 18 is coupled to controller 52. Pre-crash sensor 18 generates an object signal in the presence of an object within its field of view. Pre-crash sensor 18 may be comprised of one or a number of types of sensors including a radar 62, a lidar 64, and a vision system 66. Vision system 66 may be comprised of one or more cameras, CCD, or CMOS type devices. As illustrated, a first camera 68 and a second camera 70 may form vision system 66. Both radar 62 and lidar 64 are capable of sensing the presence and the distance of an object from the vehicle. When used as a stereo pair, cameras 68 and 70 acting together are also capable of detecting the distance of an object from the vehicle. In another embodiment of the invention vision system consisting of cameras 1 and 2 alone may use established triangulation techniques to determine the presence of an object and the distance from the vehicle as well as the object's size that may include area, height or width, or combinations thereof. The cameras are may be high-speed cameras operating in excess of 100 Hz. A suitable example is a CMOS-based high dynamic range camera capable of operating under widely differing lighting and contrast conditions. Finally, as will be further described below, radar 62, lidar 64 and/or vision system 66 may be used to detect an object and the mechanical contact sensor 22 may be used to confirm the presence of the object and to provide the stiffness of the object to controller 52.

A receiver 91 may also be included within pre-crash sensor 18. The receiver 91 may, however, be a stand-alone device. Receiver 91 is also coupled to controller 52.

A vehicle dynamics detector 72 is also coupled to controller 52. The vehicle dynamics detector 72 generates a signal or signals indicative of the dynamic conditions of the vehicle. The vehicle dynamics detector 72 may comprise various numbers or combinations of sensors but preferably include a speed sensor 74, a yaw rate sensor 76, and a steering wheel angle sensor 78.

Speed sensor 74 may be one of a variety of speed sensors known to those skilled in the art. For example, a suitable speed sensor may include a sensor at every wheel that is averaged by controller 52. Preferably, controller 52 translates the wheel speeds into the speed of the vehicle. Suitable type of speed sensors 74 may include, for example, toothed wheel sensors such as those employed on anti-lock brake systems.

Yaw rate sensor 76 preferably provides the yaw rate of the vehicle about the center of gravity of the vehicle. The yaw rate measures the rotational tendency of the vehicle about an axis normal to the surface of the road. Although yaw rate sensor is preferably located at the center of gravity, those skilled in the art will recognize that the yaw rate sensor may be located in various locations of the vehicle and translated back to the center of gravity either through calculations at the yaw rate sensor 76 or through calculations within controller 52 in a known manner.

Steering wheel angle sensor 78 provides a steering wheel angle signal to controller 52. The steering wheel angle signal corresponds to the steering wheel angle of the hand wheel of the automotive vehicle.

A global positioning system (GPS) 96 may also be coupled to controller 52. GPS system 96 generates a position of the host vehicle 10 in response to satellite signals. Controller 52 may use this information in determining the dynamics of the host vehicle.

A transponder 98 may also be coupled to controller 52. Transponder 98 may generate information from controller 52 and transmit it to other vehicles upon the reception of a predetermined frequency signal from another vehicle. Also, transponder 98 may always be activated and broadcasting vehicle information to other vehicles. Transponder 98 and receiver 91 may be located in a common location and integrally formed therewith.

Controller 52 is used to control the activation of a countermeasure system 100. Each countermeasure may have an individual actuator associated therewith. In that case, controller 52 may direct the individual countermeasure actuator to activate the countermeasure. Various types of countermeasure systems will be evident to those skilled in the art. For various devices the restraint control module 20 may be controlled. Examples of a countermeasure within countermeasure system include occupant belt pretensioning 102, front interior airbags 104, side curtain airbags 106, exterior or pedestrian protection airbags 108, knee bolsters 110, bumper height changing 112 including nose dipping, braking 114, and other measures 116 such as but not limited to steering column position, seat position and window closure. Preferably, controller 52 is programmed to activate the appropriate countermeasure in response to the inputs from the various sensors. As will be described below, the controller may choose the countermeasure based on the type, orientation, classification, and stiffness of the collision object.

Figure 4:
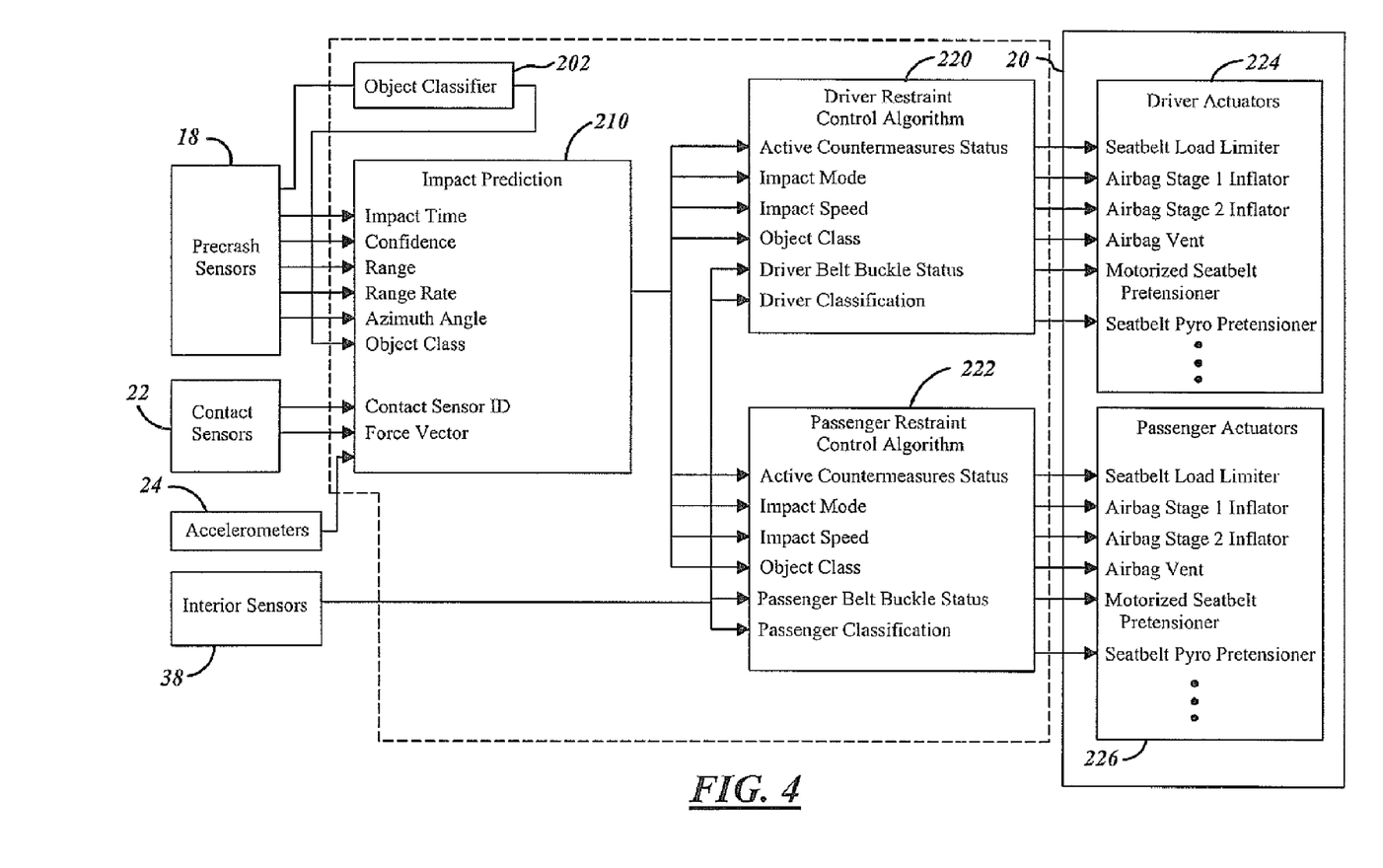
FIG. 4 is a block diagrammatic view of the controller 52 of FIG. 3.

Referring now to FIG. 4, a portion of controller 52 and a portion of the restraint control module 20 are illustrated in further detail. Controller 52 has an object classifier 202 therein. Object classifier 202 may be implemented in hardware or software. Object classifier 202 may be used to provide an object orientation and an object classification to an impact prediction module 210. Although object classifier 202 is illustrated as part of controller 52, object classifier 202 may be part of vision system 66 or pre-crash or object sensor 18. Object classifier 202 may compute various information based on the images received. For example, the shape and feature-based metrics may be used for potential collision assessment and countermeasure activation decisions. Vehicle features may include but are not limited to ground clearance, tire profiles, tire size, tire separation distance, the number of tires, height and width of the object, a cross-sectional contour of the vehicle including engine compartment, passenger compartment, and trunk or truck bed area, presence of bumpers, bumper height, front and rear license plates, front and rear lighting fixtures, front and rear lights, front grill, front and rear windshield wipers, exterior mounted spare tire, sideview mirrors, B and C pillar lines, towing gear, wheel well profiles, steering wheel profiles, human passenger profiles, relative positioning of the objects, rear axle and exhaust systems. Typically, the target vehicle information will be maintained over time until an accurate classification can be determined. Object classifier 202 may also be fuzzy logic-based.

The controller 52 combines the information such as object distance, azimuth position, relative velocity, relative acceleration, object classification, and orientation, and other host vehicle information from the vehicle dynamics detector 72 such as speed, yaw rate, and steering wheel position to deploy the appropriate actuator. The controller 52 utilizes the sensor inputs and based on rules deploys safety systems only to the extent that it is required according to the sensed condition, vehicle dynamics, and compatibility with the other vehicle. The controller 52 may also use near-zone sensing from sensors such as a radar/lidar sensor, transponder, and global positioning system to improve the reliability and robustness of the pre-crash sensing decisions. The controller 52 may be a stand-alone processor or part of another vehicle system.

The radar of the pre-crash sensors 18 identifies longer range targets and can compute their azimuth angle, size, range and range rate. The cameras 68, 70 may be used for classification of objects into vehicle, non-vehicle, pole, etc. The LIDAR 64 computes close range closing velocity and separates targets into multiple detection zones. For example, the detection zones may correspond to driver side, central or passenger side zones. The data from the object classifier 202, the pre-crash sensors 18 and the contact sensors 22 are coupled to impact prediction block 210. The data from the various sensors are fused together, preferably in software, to provide an impact prediction for the rest of the system and allows the confirmation of the targets from multiple sensors. The prediction calculation may also include a confidence level calculated by using time-in-view, pattern matching, and the like, to provide a metric defining a confidence of the predicted collision. A path crossing impact such as at traffic intersections may not be in view long enough to calculate a reliable impact. Vision and laser sensors also have inherent limitations such as from environment-related conditions. For these reasons, the pre-crash sensors and corresponding software-based predictions are combined with additional sensor-based predictions to achieve the needed reliability for restraint system deployment before collision. When the confidence level is not sufficient to predeploy or pre-arm the irreversible restraints, the restraints may be deployed conventionally using the accelerometer 24 output in a conventional manner.

The protruding contact sensors 22 are provided to make the system more reliable. Due to the probabilistic nature of remote sensor-based pre-crash collision predictions due to the limitations of the sensors described above, it may be desirable to provide a more reliable confirmation such as a protruding contact sensor 22.

The pre-crash sensors 18 provide impact time, confidence, range, range rate, azimuth angle, and the object classifier 202 provides an object classification. The protruding contact sensors 22 may provide contact sensor location information and a force profile provided from the contact sensor. Accelerometers 24 provide various accelerations such as longitudinal and lateral accelerations. The impact prediction block 210 is coupled to a driver restraint control algorithm 220 and a passenger restraint control algorithm 222. Interior sensors 38 are also coupled to driver restraint control algorithm 220 and passenger restraint control algorithm 222. The interior sensors 38 provide various information such as the driver belt buckle status and driver classification. The driver classification may be based upon weight and range. The range may include which percentile the occupant is in, the position of the seat, and the driver belt buckle status. Thus, interior sensors provide information about the occupants so that proper restraint deployments may take place. The impact prediction block 210 provides active countermeasure status, the impact mode, impact speed, and object classification to the driver restraint control algorithm 220 and the passenger restraint control algorithm 222. The driver restraint control algorithm 220 is coupled to driver restraint actuators 224 and the passenger restraint control module 222 is coupled to the passenger restraint actuators 226. The driver restraint actuators and passenger restraint actuators receive information about the deployment of the various devices including a seatbelt load limiter, airbag stage 1 inflator, airbag stage 2 inflator, airbag venting, motorized seatbelt pretensioner, and seatbelt pyropretensioner. The driver and passenger restraint control algorithms generate various timings for these devices.

Figure 5:
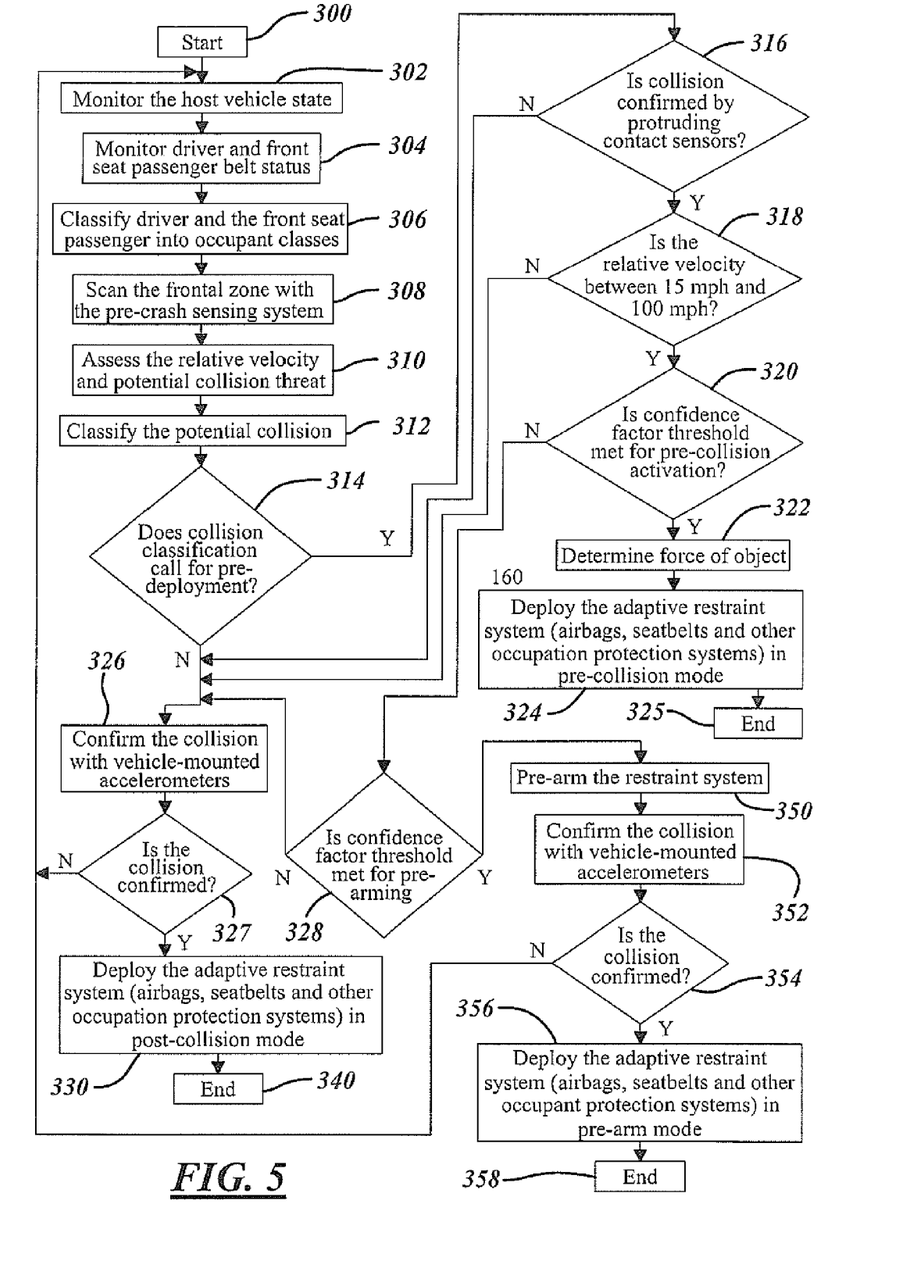
FIG. 5 is a flow chart illustrating a method for operating the present invention for frontal collision occupant protection.

Referring now to FIG. 5, a method of operating the present invention starts in block 300. In block 302, the host vehicle state is monitored. The monitoring may take place with vehicle dynamics detector 72, protruding contact sensors 22, accelerometers 24, and various other sensors of the vehicle. In step 304, the driver and passenger seatbelt status is determined. In step 306, the driver and front seat passenger are classified into occupant classes such as their weight category and position. In step 308, the frontal zone of the vehicle is scanned with the pre-crash sensing system. In step 310, the relative velocity and potential collision threat is assessed. In step 312, the potential collision is classified. Various types of classification may take place including a full frontal collision, an offset collision, a collision with a rigid barrier, the type of object into which the vehicle may be colliding, and the like. Various types of collisions may call for a predeployment. In step 314, if the collision classification calls for predeployment, step 316 is implemented. In step 316, the collision is confirmed by the protruding contact sensors. If the protruding contact sensors detect an impending collision, step 318 is performed. In step 318, if the relative velocity of the vehicle is between 15 mph and 100 mph, step 320 is performed. The velocity range, of course, may vary depending on the vehicle type. 15 and 100 mph were arbitrarily chosen. In step 320, a confidence of the measurements in steps 310 through 316 is compared to a confidence threshold. As mentioned above, the confidence may be determined in the impact prediction module 210 based upon the various types of sensors and the outputs of the sensors. In step 322, the contact force of the collision object is determined as described later. In step 324, the adaptive restraint such as airbag, seatbelt pretensioners, or other protection is deployed in a pre-collision mode. The pre-collision deployment may be based upon the force of contact with the protruding contact sensors described above. The contact sensors may also be only used to confirm contact rather than provide a force determination. In step 325, the algorithm ends.

Referring back to steps 314, 316, and 318, if any of the above decisions are no, then step 326 is implemented. If in step 320 the confidence factor has not been met, step 328 is implemented. In step 328, if the confidence factor threshold is not met for pre-arming, step 326 is also implemented. After step 326, step 327 determines if the collision has been confirmed with the vehicle-mounted accelerometers. In step 327, if a collision has not been confirmed with the accelerometers, step 302 is again executed. In step 327, if the vehicle collision has been confirmed, step 330 is implemented in which the adaptive restraints are deployed in a post-collision mode. It should be noted that the post-collision mode is a normal mode typically found in vehicles today. In step 340, the system ends after the deployment of the adaptive restraints in a post-collision mode.

Referring back to step 328, if the confidence factor threshold has been met for pre-arming, step 350 is performed. In step 350 the restraint system is pre-armed and in step 352 the collision is confirmed with vehicle-mounted accelerometers. If the collision is confirmed in step 354, then the adaptive restraints are deployed in a pre-armed mode in step 356. This process ends in step 358.

Figure 6:
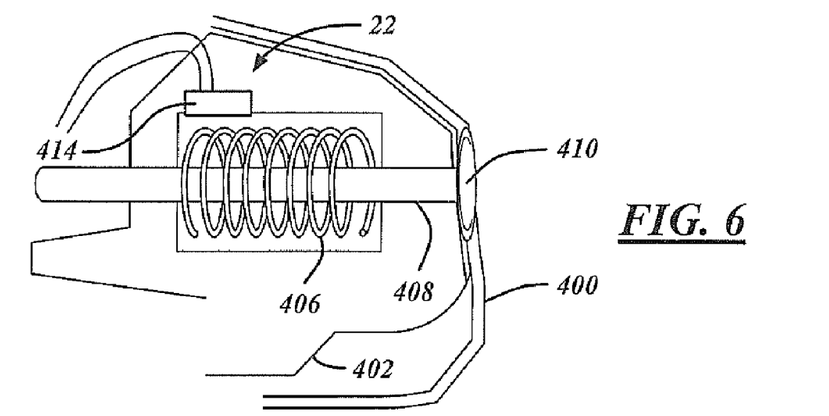
FIG. 6 is a side cutaway view of a protruding contact sensor according to the present invention in the retracted position.
Figure 7:
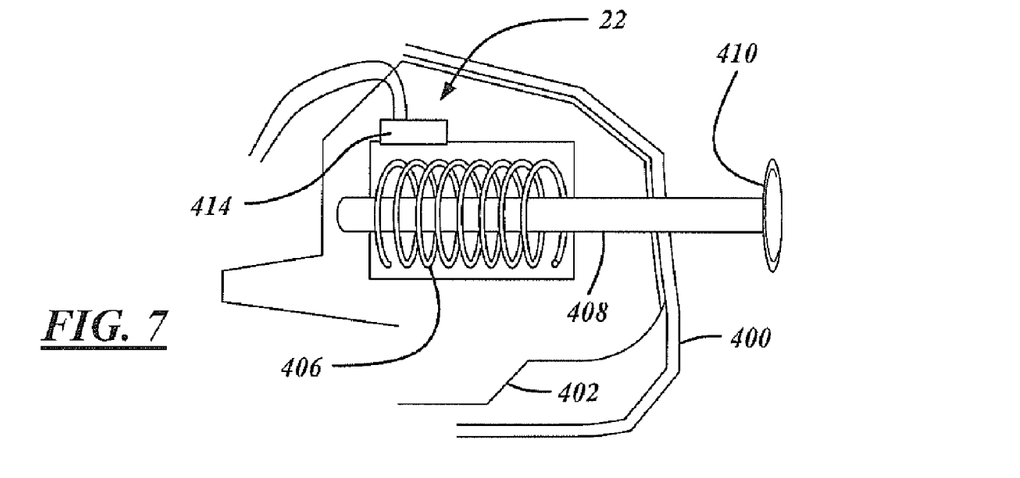
FIG. 7 is a side cutaway view of a protruding contact sensor according to the present invention in the extended position.

Referring now to FIGS. 6 and 7, one embodiment of a protruding contact sensor 22 is illustrated. A cutaway view of a bumper 400 is illustrated having bumper foam 402 therein. The contact sensor 22 includes an electrical solenoid 406 which, when activated, extends a cylindrical rod 408 horizontally away from the vehicle. Rod 408 has a contact plate 410 attached to an end thereof. The contact plate 410 spreads the force measurement over a larger area than the rod itself. The solenoid 406 incorporates an electro-motive force (EMF) sensor 414, which senses the back-EMF produced by the rod in the solenoid, when the rod is pushed back by some external force.

The contact plate 410 is normally flush with the vehicle exterior so that when the vehicle is stationary there are no parts extending from the body. Under normal operation, when the vehicle is in motion, the solenoid 406 is activated and the contact plate 410 is extended horizontally away from the vehicle. This separation distance allows the contact plate to detect a striking object before it comes into contact with the vehicle. The sensor 22 is shown integrated into the vehicle bumper cover 400, but it is not limited to that package area. The sensor could be mounted anywhere on the vehicle, and extended in the direction of interest, in order to detect impacts prior to the occurrence. The only limitation to the package space is that it must be outward enough in the vehicle to allow the protruding contact plate to extend sufficiently beyond the outer most point of the vehicle structure. When the vehicle slows down to a predetermined velocity, the solenoid is deactivated and the rod/contact plate retracts back into the vehicle to remain practically invisible to the customer. The contact plate 410 is large enough to sense a significantly larger area than the rod alone, yet small enough to integrate into the vehicle body and only require a small solenoid. This makes a practical design by not having to move the entire bumper or some other major exterior component while still enabling the detection of a majority of vehicle impacts. If additional coverage is desired, the sensor can be duplicated at multiple points along the surface of interest.

Figure 8:
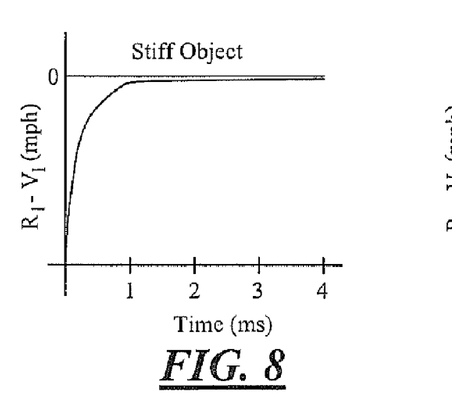
FIG. 8 is a plot of velocity change versus time for a crash into a stiff object.
Figure 9:
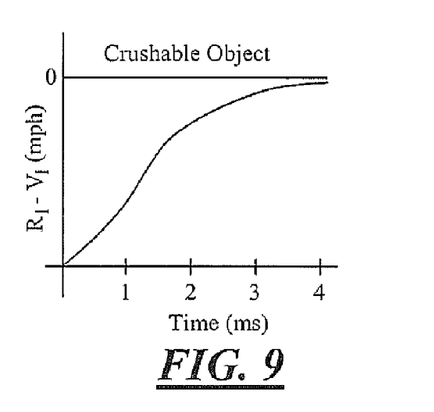
FIG. 9 is a plot of velocity change versus time for a crash into a crushable or low stiffness object.

The solenoid sensor 414 may be a hall effect sensor used to sense back-EMF of the solenoid caused by the rod. The back-EMF induced between the ends of the solenoid is proportional to the time rate at which magnetic flux is cut by the rod being forced backward. The EMF at any instant of time is proportional to the number of turns in the coil times rate of change of flux. Therefore, the value of voltage is expressed as:

$$e = N * \left[\frac{d\psi}{dt}\right] * K$$

where:
e=voltage
N=the number of turns
dψ/dt=the rate of change of flux
K=system dependent constant Thus, given a constant number of turns in the solenoid, the voltage induced by the back-EMF is directly proportional to the rate of change of flux, which is a result of the velocity at which the rod is being forced back. Having obtained the velocity at which the rod is moving back into the vehicle, further calculations may be carried out to obtain more useful metrics for crash detection. The velocity of the rod ($r_1$) is compared with the closing velocity of the accident ($v_1$), which is normally calculated by the conventional pre-crash sensing system. The force generated by the solenoid acting against the rod ensures that $r_1$ will always be less than $v_1$. In addition, the velocity of the rod is reduced by the crush of the object that it is striking. Thus, if $v_1$ is known, and the force of the solenoid is known, the stiffness of the struck object can be inferred by detecting $r_1$ as illustrated in FIGS. 8 and 9.

The information on stiffness of the object is of major benefit to conventional pre-crash sensors such as radar and vision, which can detect closing velocity and size, but cannot detect mass or stiffness of the object in the vehicle's path. When combined with the mechanical pre-crash sensor however, the restraints system can make improved calculations concerning the severity of a crash before it happens.

The combination of impact verification and stiffness detection makes this mechanical pre-crash sensor the ideal compliment to existing, conventional pre-crash sensors. It can be used in the front of the vehicle, as well as the side and rear, to achieve earlier deployment times for non-reversible restraints, providing additional safety for the occupants. By way of example, by extending the contact plate 6" forward from the vehicle structure, the sensor comes into contact with an object 5.7 ms before impact at 60 mph closing velocity. Assuming a nominal time of 2 ms for the contact plate to be displaced and the values calculated by the microprocessor in the airbag electronics control unit ECU, the mechanical pre-crash sensor could accurately verify the pre-crash sensor's predicted impact nearly 4 ms prior to impact. This would allow deployment of non-reversible restraints devices at 3-4 ms prior to vehicle impact, compared to a typical deployment time of 15-50 ms post impact for a 60 mph vehicle-to-vehicle impact. The difference in deployment decision time would substantially increase the time allowed for the driver and passenger airbags to inflate, allowing for more benign inflation rates, and for more flexibility in airbag deployment characteristics.

Another aspect of the invention is the fact that the sensor is retracted (hidden) when the vehicle is stopped, for both safety and appearance reasons. The solenoid can receive a signal from the vehicle velocity sensor, and be programmed to extend the contact plate when the vehicle reaches a certain velocity (eg. 10 mph) and then retract the contact plate once the velocity drops back below the threshold. An alternate embodiment of the invention would be a signal from the pre-crash sensor system that indicates a target has been identified and that a chance of impact exists, therefore the contact plate is extended in anticipation of a potential event. When targets have disappeared or are not in danger of collision with the host vehicle, the contact plate retracts to its original position.

An alternate embodiment of the invention would be to use the mechanical pre-crash sensor in conjunction with a conventional post-impact airbag sensor system. In this embodiment, the mechanical pre-crash sensor could be the sole source of pre-impact information, and would be used to reduce the airbag deployment decision time considerably, when compared with the post-impact sensing system alone. This would provide a low cost alternative to conventional pre-crash sensing for improving post-impact deployment times.

While particular embodiments of the invention have been shown and described, numerous variations and alternate embodiments will occur to those skilled in the art. Accordingly, it is intended that the invention be limited only in terms of the appended claims.

What is claimed is:

1. A method of operating a restraint system comprising:
classifying a collision into a collision classification;
generating a contact sensor output from a contact sensor protruding from an exterior surface of the vehicle; and
deploying the restraint system in response to the protruding contact sensor output and the collision classification.

2. A method as recited in claim 1 further comprising determining an occupant class and wherein deploying comprises deploying the restraint system in response to the protruding contact sensor output, the collision classification and the occupant class.

3. A method as recited in claim 1 wherein the step of classifying comprises monitoring a host vehicle state.

4. A method as recited in claim 1 further comprising extending said protruding contact sensor above a predetermined vehicle velocity.

5. A method as recited in claim 4 wherein the predetermined vehicle velocity is about 15 miles an hour.

6. A method as recited in claim 1 wherein deploying a restraint system comprises activating a seatbelt pretensioner.

7. A method as recited in claim 1 wherein the protruding contact sensor output corresponds to a sensor force.

* * * * *